(12) United States Patent
Shen

(10) Patent No.: US 11,248,137 B2
(45) Date of Patent: Feb. 15, 2022

(54) DIGITAL NOTEPAD

(71) Applicant: Pathway Innovations and Technologies, Inc., San Diego, CA (US)

(72) Inventor: Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 184 days.

(21) Appl. No.: 15/849,655

(22) Filed: Dec. 20, 2017

(65) Prior Publication Data

US 2018/0173358 A1 Jun. 21, 2018

Related U.S. Application Data

(60) Provisional application No. 62/436,891, filed on Dec. 20, 2016.

(30) Foreign Application Priority Data

Dec. 30, 2016 (CN) .......................... 201611252267.5

(51) Int. Cl.
*C09D 11/50* (2014.01)
*B42D 5/00* (2006.01)
(Continued)

(52) U.S. Cl.
CPC .............. *C09D 11/50* (2013.01); *B42D 5/006* (2013.01); *G06F 3/04883* (2013.01)

(58) Field of Classification Search
CPC ..... G06F 3/041–04883; G06F 3/03545; G06F 3/0414; G06F 3/04883; G06F 3/044;
(Continued)

(56) References Cited

U.S. PATENT DOCUMENTS 5,049,862 A * 9/1991 Dao ...................... G06F 1/1626
178/18.03
5,262,374 A * 11/1993 Okabe ...................... B41M 5/28
347/264

(Continued)

*Primary Examiner* — Temesghen Ghebretinsae
*Assistant Examiner* — Ivelisse Martinez Quiles
(74) *Attorney, Agent, or Firm* — Insigne PC

(57) ABSTRACT

A digital notepad is disclosed that includes an onboard computer, a base having retainers, a writing instrument having a tip that is configured to deliver ink, a plurality of sheets of paper, and a plurality of touch sensors communicatively connected to the onboard computer. The onboard computer includes one or more computer processors and a program loaded thereon configured to read information from at least one of the plurality of touch sensors. At least one of the touch sensors of the plurality of touch sensors may be integrated into the base. At least one of the plurality of sheets of paper may be retained on the base and in close proximity to the at least one of the touch sensors. The digital notepad may further include a display screen communicatively connected to the onboard computer and configured to display markings read by at least one of the plurality of touch sensors. In another embodiment, the digital notepad's writing instrument includes thermally reactive ink. In another embodiment, the digital notepad includes an eraser movably and detachably connected to the base. The eraser may include a thermal unit that is configured to change the temperature of the thermally reactive ink on at least one of the plurality of sheets of paper, such that a reaction is induced.

16 Claims, 14 Drawing Sheets

(51) Int. Cl.
*G06F 3/0488* (2013.01)
*G06F 3/04883* (2022.01)

(58) Field of Classification Search
CPC ....... G06F 3/0412; B42D 5/006; C09D 11/50; H04L 67/1097; G06K 9/00402
See application file for complete search history.

(56) References Cited

U.S. PATENT DOCUMENTS

| | | | | |
|---|---|---|---|---|
| 5,629,499 A * | 5/1997 | Flickinger | G06F 1/1626 | 178/18.01 |
| 5,838,819 A * | 11/1998 | Ruedisueli | G06F 1/1611 | 382/187 |
| 8,970,540 B1 * | 3/2015 | Hebenstreit | G06F 17/241 | 178/18.01 |
| 9,844,965 B1 * | 12/2017 | Lemay | B42D 3/123 | |
| 2002/0003726 A1 * | 1/2002 | Hattori | G06F 3/03545 | 365/200 |
| 2006/0097991 A1 | 5/2006 | Hotelling et al. | | |
| 2009/0000830 A1 * | 1/2009 | Kim | G06F 1/1616 | 178/18.03 |
| 2012/0331546 A1 * | 12/2012 | Falkenburg | G06F 3/03545 | 726/16 |
| 2013/0075385 A1 * | 3/2013 | Rosen | B43L 19/00 | 219/233 |
| 2013/0082830 A1 * | 4/2013 | Rosen | G09B 21/003 | 340/407.2 |
| 2014/0132533 A1 * | 5/2014 | Inaba | G06F 3/03545 | 345/173 |
| 2014/0362011 A1 * | 12/2014 | Niwa | B42F 9/002 | 345/173 |
| 2015/0242012 A1 * | 8/2015 | Petcavich | G06F 1/1652 | 345/174 |
| 2016/0062491 A1 * | 3/2016 | Shibata | G06F 3/03545 | 345/173 |
| 2016/0125225 A1 * | 5/2016 | Ebihara | G06F 3/0414 | 382/115 |
| 2016/0162048 A1 * | 6/2016 | David | G06F 1/1626 | 345/179 |
| 2016/0162178 A1 * | 6/2016 | Fukumura | G06F 3/0433 | 345/174 |

* cited by examiner

DIGITAL NOTEPAD

CROSS-REFERENCE TO RELATED APPLICATIONS

The present application claims priority to U.S. Provisional Application No. 62/436,891, filed on Dec. 20, 2016 entitled, "DIGITAL NOTEPAD," the complete disclosure of which is hereby incorporated by reference in its entirety. The present application also claims priority to Chinese Patent Application No. 201611252267.5 filed on Dec. 30, 2016 entitled, "Electronic Writing Device and Writing Method Thereof," the complete disclosure of which is hereby incorporated by reference it its entirety.

BACKGROUND OF THE INVENTION

1. Field of Invention

The present disclosure relates to notepads, specifically, a digital notepad incorporating paper that captures, records, and transmits markings made thereon.

2. Description of Related Art

Paper notepads are ubiquitously known in the art. Generally, such note pads comprise a plurality of sheets of paper that are sometimes bound together at one or more edges. Typically, such notepads take the form of a legal-type pad or a bound book containing blank or lined pages. To write, users generally use devices such as pens, markers, or pencils on the paper. Because such writing apparatuses have been used for centuries throughout human history, people have become accustomed to the tactile experience of using a pen to write or draw on paper. One drawback is that many sheets of paper are often required for writing or drafting, forcing the user to also discard many sheets of paper. Another drawback is that to record a sheet of paper, a copy of the sheet must be made either through hand-written means or the use of an electronic copier. Additionally, digitally capturing a copy of the paper requires the user to capture a digital image of the page by using a camera or a scanner-type device.

To overcome wasting sheets of discarded paper, erasable inks have been developed. Such inks require an eraser to be applied and rubbed on the ink to remove it from the paper. Due to the required friction between the eraser and the paper, the eraser damages the paper and ultimately, will tear the paper, rendering it useless. Thermally-reactive ink has also been developed. Such inventions require the user to have a preheated eraser that heats the page, or a portion thereof, to a sufficiently high temperature such that the thermally-reactive ink becomes transparent. This configuration requires the user to have an external device, such as a flat iron commonly used to style hair, to be present and preheated to a sufficiently high temperature. Alternatively, a microwave oven may be used to hear the sheet of paper to induce the thermal reaction.

As the digital age progresses, so too have notepads. Common in the art are digital notepads that comprise a display screen, a stylus, and a computer to run the necessary program. In such an embodiment, the user will use a stylus to contact and draw on the display screen. However, to change colors, the user must select the desired color from somewhere on the computer screen. This type of digital notepad has several drawbacks. First, using a stylus on a digital notepad does not have the same tactile response as a traditional, paper notepad. Also, forcing the user to stop drawing, bring up a menu, and select the desired color or impression is not conducive to the experience of a traditional notepad, nor is it intuitive for the user. Second, the stylus often will have inconsistent connectivity with the digital notepad, resulting drawings and markings that are inconsistent. This is usually caused by the distance between the stylus' tip and the sensor reading the stylus; usually caused by a glass or polymer layer laid over the sensor. Also, the user's palm or arm will touch the digital notepad, causing erroneous markings on the screen. This usually forces the user to adjust their writing form. Additionally, if the information displayed on the digital notepad is electronically stored, the information must be stored locally, and then any remotely-stored information must be pushed.

Several forms of touch sensing technologies have been developed and are prevalent in the art. For example, resistive touch sensing technology utilizes two flexible sheets coated with a resistive material and separated by an air gap or microdots. These two sheets usually have horizontal and vertical lines that, when pressed together, register the location of the touch. However, this technology can only register a single contact point and is prone to false readings made by anything other than the tip of the stylus—e.g., the user's palm or arm. Further, this technology is limited to digital screens and is not available embedded within a sheet of paper.

In another example of existing touch sensing technology, capacitive touch sensing technology is available in the art. There are two types of capacitive sensing systems: mutual capacitance, where the object, e.g., a finger or conductive stylus, alters the mutual coupling between row and column electrodes, which are scanned sequentially; and self- or absolute capacitance where the object, e.g., a finger, loads the sensor or increases the parasitic capacitance to ground. In both cases, the difference of a preceding absolute position from the present absolute position yields the relative motion of the object or finger during that time. See, e.g., United States Patent Application Publication No. 20060097991 to Hotelling et al., published on May 11, 2006, the complete disclosure of which is incorporated by reference herein. These types of technologies do not provide a user with the experience of using the traditional paper and pen.

Projected capacitance touch technology is also available. Such a system requires etching of the conductive layer, forming an X-Y grid by etching a single layer to form a grid pattern of electrodes, or by etching two separate, parallel layers of conductive materials with perpendicular lines or tracks to form the grid. Such technology is commonly used in modern touch-sensitive liquid crystal displays ("LCDs"). As a variant of projected capacitance touch technology, mutual capacitance sensors have a capacitor at each intersection of each row and each column. A voltage is applied to the rows or columns. Bringing a finger or conductive stylus near the surface of the sensor changes the local electric field which reduces the mutual capacitance. The capacitance changes at every individual point on the grid can be measured to determine the touch location by measuring the voltage in the other axis. Mutual capacitance allows multi-touch operation where multiple fingers, palms, or styli can be tracked. Like the other forms of touch-sensing technology, these types to not provide a user with the experience of using the traditional paper and pen.

Therefore, what is needed is a digital notepad that captures, records, and transmits drawings marked on a paper writing surface using commonly available pens without requiring the user to deviate from their natural writing style. This need has heretofore remained unsatisfied.

SUMMARY OF THE INVENTION

The present disclosure overcomes these and other deficiencies of the prior art by providing a digital notepad comprising an onboard computer, a base having retainers, a writing instrument having a tip, wherein the tip is configured to deliver ink, a plurality of sheets of paper, and a plurality of touch sensors communicatively connected to the onboard computer. The onboard computer comprises one or more computer processors and a program loaded and executed thereon configured to read information from at least one of the plurality of touch sensors. At least one of the touch sensors of the plurality of touch sensors is integrated into the base. At least one of the plurality of sheets of paper is retained on the base and in close proximity to the at least one of the touch sensors by at least one of the plurality retainers.

In another embodiment, the digital notepad further comprises a display screen communicatively connected to the onboard computer and configured to display markings read by at least one of the plurality of touch sensors. In another embodiment, the digital notepad's writing instrument has thermally reactive ink. In another embodiment, the digital notepad has an eraser movably and detachably connected to the base. In another embodiment, the digital notepad's eraser comprises a thermal unit that is configured to change the temperature of the thermally reactive ink on at least one of the plurality of sheets of paper, such that a reaction is induced. In another embodiment, at least one of the touch sensors comprises a sensor selected from the group consisting of: a resistive touch sensor, a capacitive touch sensor, and a projected capacitance touch sensor. In another embodiment, at least one of the plurality of sheets of paper comprises at least one of the plurality of touch sensors, wherein the touch sensor integrated into the sheet of paper is communicatively connected to the onboard computer. In another embodiment, the digital notepad has a support movably attached to the base, the support comprising a binder configured to retain one or more sheets of the plurality of sheets of paper. In another embodiment, the digital notepad's onboard computer is communicatively connected to an external computer or an external database. In another embodiment, the digital notepad's display screen further comprises a mobile device.

In another exemplary embodiment of the present disclosure, a system for taking notes is disclosed, comprising: an onboard computer, a writing instrument comprising a tip configured to draw ink from a reservoir, a plurality of sheets of paper, a plurality of touch sensors communicatively connected to the onboard computer, a base comprising a plurality of retainers, wherein at least one of the touch sensors is integrated into the base, and a method for capturing notes comprising the steps of: placing at least one of the sheets of paper near at least one of the plurality of touch sensors; marking, on at least one of the sheets of paper, using the writing instrument; reading, by at least one of the plurality of touch sensors, attributes of the marks made on the at least one of the sheets of paper, the attributes including positional information relating to the markings relative to the touch sensor; and receiving, at the onboard computer, the attributes read by the at least one of the touch sensors.

In another embodiment, the system for taking notes, further comprises a display screen moveably and detachably connected to the base, wherein the display screen is communicatively connected to the onboard computer; and wherein the method further comprises the steps of sending, from the onboard computer to the display screen, the positional information read from the at least one of the plurality of touch sensors; and displaying, on the display screen, a graphical representation of the positional information read from the at least one of the plurality of touch sensors.

In another exemplary embodiment, the system for taking notes further comprises: an eraser movably attached to the base, the eraser comprising a thermal unit; wherein the ink comprises thermally reactive ink; and wherein the method further comprises the step of erasing, the step of erasing comprising the steps of: heating the thermal unit to a temperature sufficient to induce a reaction of the thermally reactive ink; traversing the eraser near an area of the paper having thermally reactive ink thereon; and inducing the reaction of the thermally reactive ink. In another embodiment, the system for taking notes, wherein at least one of the sheets of paper comprise at least one of the plurality of touch sensors. In another embodiment, the system for taking notes, wherein the onboard computer is communicatively connected to an external computer or an external database; and wherein the method further comprises the step of sending information to the external computer or the external database.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

DETAILED DESCRIPTION OF EMBODIMENTS

Figure 1:
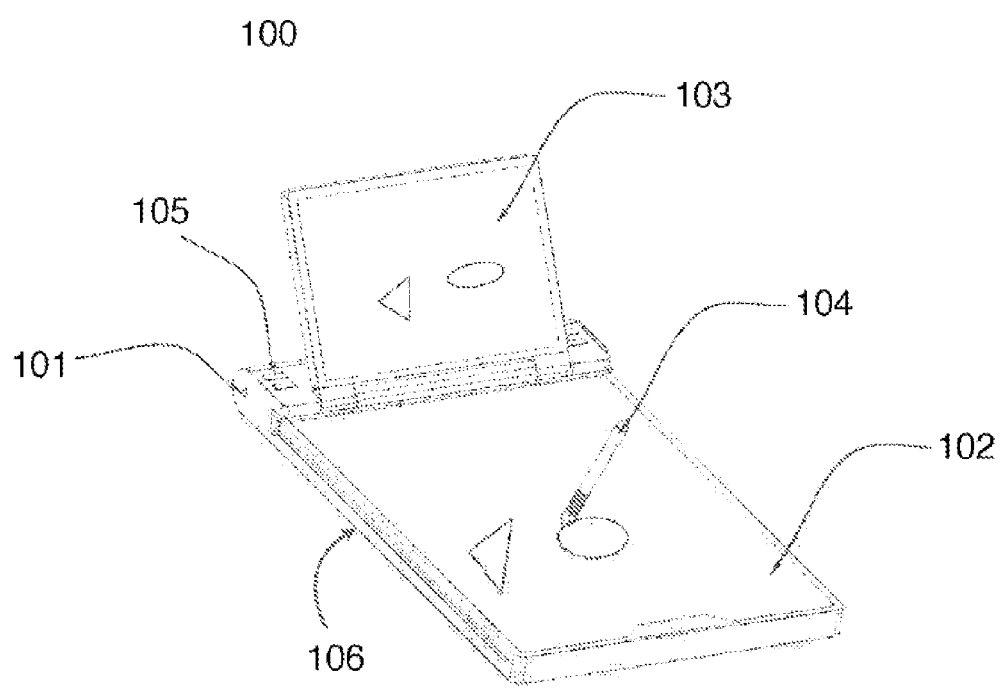
FIG. 1 is an isometric assembly view of a digital notepad, according to an exemplary embodiment of the present disclosure.

Further features and advantages of the disclosure, as well as the structure and operation of various embodiments of the disclosure, are described in detail below with reference to the accompanying FIGS. 1-11. Although the disclosure is described in the context of a handheld digital notepad, the term digital notepad refers to any type of writing or drawing device that comprises one or more pens and a plurality of touch sensors, including, but not limited to, handheld notetaking, storing, and displaying devices.

In an exemplary embodiment of the present disclosure, the digital notepad comprises a body having a writing surface, a touch sensor, a writing instrument, and an eraser. The body comprises an onboard computer having one or more computer processors configured to execute non-transient code and having a suitable operating system installed thereon to effectuate the embodiments described herein. Implementation of code on a computer processor is readily apparent to one of ordinary skill in the art. The body is communicatively connected to the touch sensor. The notepad's body and/or onboard computer may also be communicatively connected to another computer or database such that the digital notepad synchronously exchanges information between it and the computer or database. In such an embodiment, the digital notepad may be communicatively connected to a local or remote database that may, in turn, communicate the information to a plurality of external devices. The writing surface may comprise a plurality of sheets of paper.

In another exemplary embodiment of the present disclosure, the digital notepad uses a touch sensor capable of detecting strokes of the writing instrument. In one embodiment, the touch sensor is embedded within the sheet of paper. In such an embodiment, a capacitive or resistive touch sensor may be used as a sub-surface layer in a sheet of paper allowing the user to mark on one side of the sheet of paper. Additionally, the touch sensor may be embedded within a sheet of paper such that the user may mark on either side of the sheet of paper. In such an embodiment, the sensor is communicatively connected to the digital notepad. The connectivity may be achieved through a wired connection using a flexible printed circuit embedded within or attached to the sheet of paper. Such an embodiment may use a single sheet of paper having the touch sensor embedded therein or a plurality of sheets of paper comprising touch sensors embedded within the sheets and bound together. In a bound embodiment, a flexible printed circuit may be integrated into the binding to mimic traditional binding styles found in legal pads, spine-bound books, spiral bound notebooks, and three-ring binders.

In another exemplary embodiment of the present disclosure, the touch sensor may be integrated into the body of the digital notepad. In such an embodiment, the touch sensor is configured to approximate the writing area of a sheet of paper. For example, the touch sensor's sensing area may be 8.5" by 11"—the size of a sheet having the same measurements. However, the touch sensor may be any size necessary to encapsulate the writing area of any size of sheet of paper. Using a digital notepad having the touch sensor integrated into the body, a user may place a plurality of sheets of paper over the touch sensor and write or draw with the same techniques as they would with a traditional notepad.

In an embodiment of the present disclosure comprising a touch sensor integrated into the body, the user may place a sheet of paper over the body, thereby placing the paper over the sensor. In another embodiment, the user may place a plurality of sheets of paper over the body. The plurality of sheets of paper may be bound together or may be individual, loose sheets of paper. In such an embodiment, the body may also comprise a plurality of retainers to hold the plurality of sheets of paper to the digital notepad.

In another embodiment, the digital notepad may comprise a plurality of touch sensors integrated into the body, the paper, or both. Further, one of the plurality of touch sensors may be configured so that it may be placed in between sheets of paper. In such an embodiment, one of the plurality of touch sensors may be configured so that it is detached from the body of the digital notepad while remaining communicatively connected to the digital notepad. In another embodiment, one of the plurality of touch sensors is not physically integrated or attached to the body.

In another exemplary embodiment, the digital notepad utilizes a writing instrument. The writing instrument may be a traditional writing instrument such as a pen or a pencil, the identification and implementation of which are apparent to one of ordinary skill in the art. In one embodiment, the writing instrument may be a common pen and is one that is commercially and widely available. For example, the pen may be a standard ball point or felt-tip pen. Such a pen may utilize common ink. In another embodiment, the pen may be specifically adapted to increase the touch sensor's accuracy. For example, the pen's tip may comprise materials that are read by the touch sensor with greater accuracy. In another embodiment, the pen's ink may be specifically adapted to allow the touch sensor to read it with greater accuracy. For example, the ink may have additives that allow the touch sensor to detect it with greater accuracy.

In another embodiment, the writing instrument may be pen utilizing thermally-reactive ink. In such an embodiment, the ink may be adapted such that it is viewable when certain temperature ranges are applied. For example, the ink may be adapted such that the ink acts as traditional, common ink at room temperatures. In such an example, the ink may also be adapted such that it becomes transparent when heat is applied. The ink may remain transparent when the ink returns to room temperature.

In another exemplary embodiment of the present disclosure, the writing instrument may be specifically adapted to interact with and/or be communicatively connected to the digital notepad. In one embodiment, the writing instrument may be adapted to be specifically recognized by the digital notepad. For example, the writing instrument may comprise a identifier, such as an radio frequency identification ("RFID") chip that allows the digital notepad to identify the specific writing instrument being used. In another embodiment, the writing instrument comprises a body, a pluggable cap, a tip, and an ink reservoir. The writing instrument may comprise one or more computer processors configured to execute non-transient code and having a suitable operating system installed thereon to effectuate the embodiments described herein. The writing instrument may be communicatively connected to the digital notepad. The writing instrument comprises a unique identifier such that the digital notepad's installed software is able to identify characteristics of the writing instrument including the color of ink contained in the ink reservoir. The writing instrument may also comprise a power source. The tip of the writing instrument is configured to draw ink from the ink reservoir and to deliver it to the writing surface much like a traditional pen. The tip further comprises a trigger configured to interact with the digital notepad, a sheet of paper, a writing surface, or the cap. In one embodiment, the tip is configured to retract into the body when the cap is installed. In such an embodiment, the tip, body, and cap are configured such that when the cap is removed from the writing instrument, the tip releases from its detracted state and traverse outward from the writing instrument's body. When the tip traverses outward, the trigger causes the writing instrument to communicatively connect with the digital notepad, thereby initializing the connection between the two. Once connected, the writing instrument sends information to the digital notepad. Once the cap is replaced, the tip retracts into the body and the trigger terminates the connection with the digital notepad. In one embodiment, the writing instrument communicates with digital notepad using a wired connection. In another embodiment, the writing instrument communicates with the digital notepad using a wireless connection comprising Bluetooth, Wi-Fi, radio frequencies or infrared signals. The digital notepad may utilize a plurality of writing instruments, each having a unique color and/or unique identifier such that the user, to change colors, may simply select the writing instrument having the desired color without having to manually inform the digital notepad of the desired color.

In another exemplary embodiment of the present disclosure, the digital notepad comprises an eraser. The eraser is configured to remove the writing instrument's ink from the wiring surface. In one embodiment, the eraser comprises a heating element that, when applied to thermally-reactive ink, the eraser induces the ink's desired reaction. For example, in an embodiment using ink that becomes transparent when heat is applied, the eraser is configured to apply that heat to the ink such that it disappears and effectively becomes erased.

In another embodiment, the eraser comprises one or more computer processors therein configured to execute non-transient code and having a suitable operating system installed to effectuate the embodiments described herein. The eraser is communicatively connected to the digital notepad. The eraser may comprise a unique identifier such that the digital notepad's installed software is able to identify characteristics of the eraser. The eraser may also comprise a power source. In one embodiment, the eraser communicates with digital notepad using a wired connection. In another embodiment, the eraser communicates with the digital notepad using a wireless connection comprising Bluetooth, Wi-Fi, radio frequencies or infrared signals. The eraser is configured such that it interacts with the writing surface. In one embodiment, the eraser comprises a trigger configured such that eraser's firmware recognizes when the eraser makes contact with the writing surface. The trigger may recognize the eraser's interaction with the writing surface using a mechanical means or by recognizing the physical proximity of the writing service. In another embodiment, the eraser traverses the width of the writing surface and is slideably connected to the notepad. In such an embodiment, the user effectuates erasing by sliding the eraser from one end of the writing surface to the other.

In another exemplary embodiment of the present disclosure, the eraser comprises an embodiment similar to that of a pen. In such an embodiment, the tip of the eraser is configured to remove ink from the writing surface. The tip may further comprise a trigger configured to interact with the digital notepad's writing surface. In one embodiment, the tip is configured to retract into the body when the cap is installed. In such an embodiment, the tip, body, and cap are configured such that when the cap is removed from the eraser, the tip releases from its detracted state and traverse outward from the eraser's body. When the tip traverses outward, the trigger causes the eraser to communicatively connect with the digital notepad, thereby initializing the connection between the two. Once connected, the eraser sends information to the digital notepad. Once the cap is replaced, the tip retracts into the body and the trigger terminates the connection with the digital notepad. In interacting with the writing surface, the digital notepad recognizes and captures the eraser's trace on the writing surface.

In another exemplary embodiment of the present disclosure, the digital notepad comprises a screen. In one embodiment, the screen is communicatively connected to the digital notepad. The screen may comprise one or more computer processors therein configured to execute non-transient code and having a suitable operating system installed to effectuate the embodiments described herein. The screen may be configured such that it displays the markings read by the digital notepad in real-time or near real-time. The screen may be configured such that it displays other information such as a web browser, allowing the user access to the internet while using the digital notepad. In another embodiment, the screen comprises a mobile device such as a cellular telephone, a tablet, or the like. Additionally, the screen of a separate mobile device may be used in place of the screen. In such an embodiment, the user may use their mobile device's display screen in place of or in addition to the screen.

In another embodiment, the screen is movably attached to the digital notepad. In such an embodiment, the screen may be oriented into a desired position or orientation. In another embodiment, the screen may be detachably connected to the digital notepad such that it remains in communication with the digital notepad. In such an embodiment, the user may detach the screen from the digital notepad and place it apart from the body but still retain the screen's functionality as if it were physically attached.

In another embodiment, the digital notepad comprises a plurality of screens. In an embodiment, one of the plurality of screens may be integrated into the writing surface. In such an embodiment, the screen may comprise a touch sensor allowing the user to mark directly on the screen. In another embodiment, screen is integrated into the body such that a user may place a plurality of sheets of paper over the screen while maintaining the embodiments described herein.

In an exemplary embodiment of the present disclosure and with reference to FIG. 1, the digital notepad 100 comprises a writing surface 102 and a writing instrument 104. The writing instrument 104 is configured to interact with and write on the writing surface 102. The writing surface 102 may comprise a plurality of sheets of paper. The digital notepad 100 comprises a base 101 and an onboard computer 105. The onboard computer 105 comprises one or more computer processors configured to execute non-transient code and having a suitable operating system installed thereon to effectuate the embodiments described herein. The onboard computer 105 may also comprise a power source. The onboard computer 105 may also be configured such that it is communicatively connected to an external computer or database (not shown). The onboard computer 105 may also be configured to capture, record, and store video or audio information. In such an embodiment, the digital notepad 100 may comprise a microphone or camera communicatively connected to the onboard computer 105. The onboard computer 105 may also be configured to record any information displayed on the screen 103.

In another embodiment, the base 101 comprises a frame 106 traversing the perimeter of the writing surface 102. The base 101 has a touch sensor (not shown) integrated therein. The writing surface 102 may be placed over the touch sensor. In another embodiment, the digital notepad 100 comprises a screen 103. The screen 103 may be affixed to the base 101. In another embodiment, the screen 103 is rotateably affixed to the digital notepad 100. In another embodiment, the screen 103 may be releaseably attached to the digital notepad 100 such that a user can remove the screen 103 from the base 101 and use the screen 103 while detached from the base 101. A user may also reattach the screen 103 to the base 101 in a desired orientation.

In another embodiment, the screen 103 comprises one or more computer processors configured to execute non-transient code and having a suitable operating system installed thereon to effectuate the embodiments described herein. In one embodiment, the screen 103 displays the traces drawn by a user using the writing instrument 104 in real-time or near real-time. In another embodiment, the screen 103 is configured such that the user may display other information on the screen 103. For example, the screen's 103 operating system may be communicatively connected to the internet and may display a web browser.

In another embodiment, the screen 103 may be a mobile device such as a cellular phone or tablet. In such an embodiment, a user may connect an external mobile device to the digital notepad 100. In such an embodiment, the onboard computer 105 is configured to communicatively connect to the mobile device. The mobile device and the onboard computer 105 synchronously exchange information between the screen 103 and the onboard computer 105.

Figure 2:
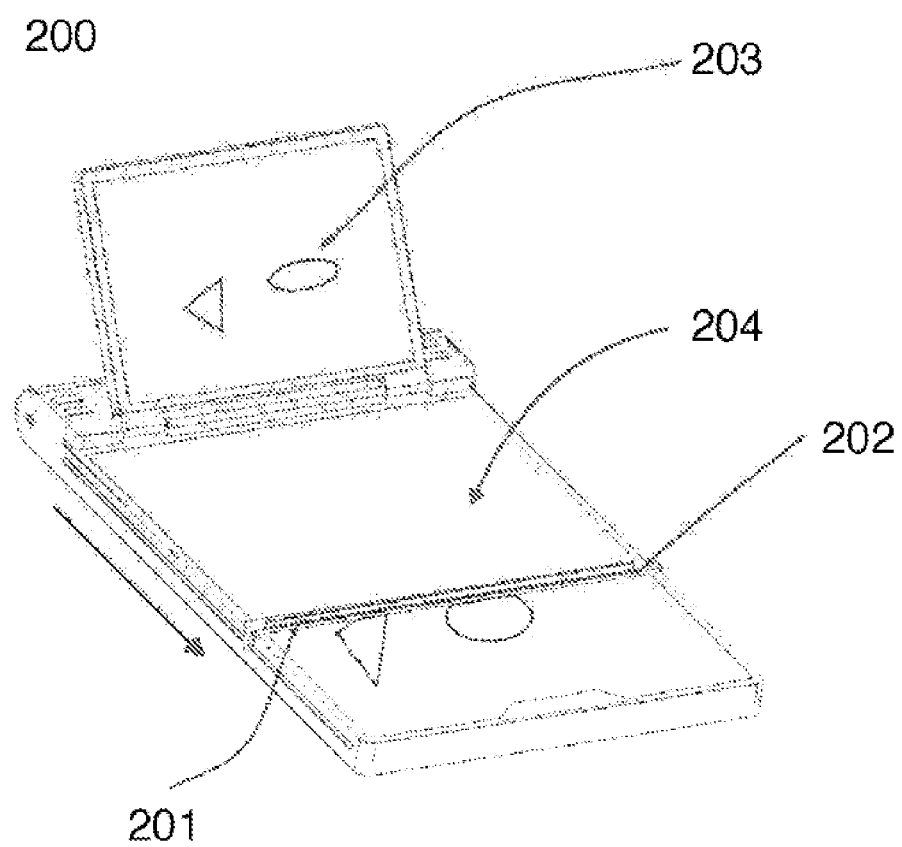
FIG. 2 is an isometric assembly view of a digital notepad showing the eraser's wiping function, according to an exemplary embodiment of the present disclosure.

In another exemplary embodiment of the present disclosure and with reference to FIG. 2, the digital notepad 200 comprises an eraser 201, a screen 203, and a writing surface 204. In one embodiment, the eraser 201 traverses the writing surface 204 and is slideably attached to the digital notepad 200. In such an embodiment, the eraser 201 is slideably connected to the digital notepad 200 at one or more connection points 202. The eraser 201 is communicatively connected to the digital notepad 200 such that the eraser 201 synchronously exchanges information with the digital notepad 200. The eraser 201 is configured to remove ink from the writing surface 204. In such an embodiment, a user may slide the eraser 201 across the writing surface 204, thereby removing the ink located on the writing surface 204. That information may be simultaneously displayed on the screen 203 in real-time or near real-time. The digital notepad 200 is configured to recognize and capture the eraser's 201 location relative to the writing surface 204 through the eraser's 201 interaction with the writing surface 204. The digital notepad 200 may also be configured to recognize and capture the eraser's 201 location relative to the writing surface 204 through the eraser's 201 one or more connection points 202. In another embodiment, the eraser 201 may be a stand-alone eraser attached to the digital notepad 200. In such an embodiment, the eraser 201 is configured such that it resembles a traditional eraser. In another embodiment, the eraser 201 is configured such that it operates as a writing instrument but instead of imparting ink onto the writing surface 204, it removes ink thereon. In another embodiment, the eraser 201 may comprise a heating unit. In such an embodiment, the eraser 201 is configured to induce a reaction from a thermally-reactive ink.

Figure 3:
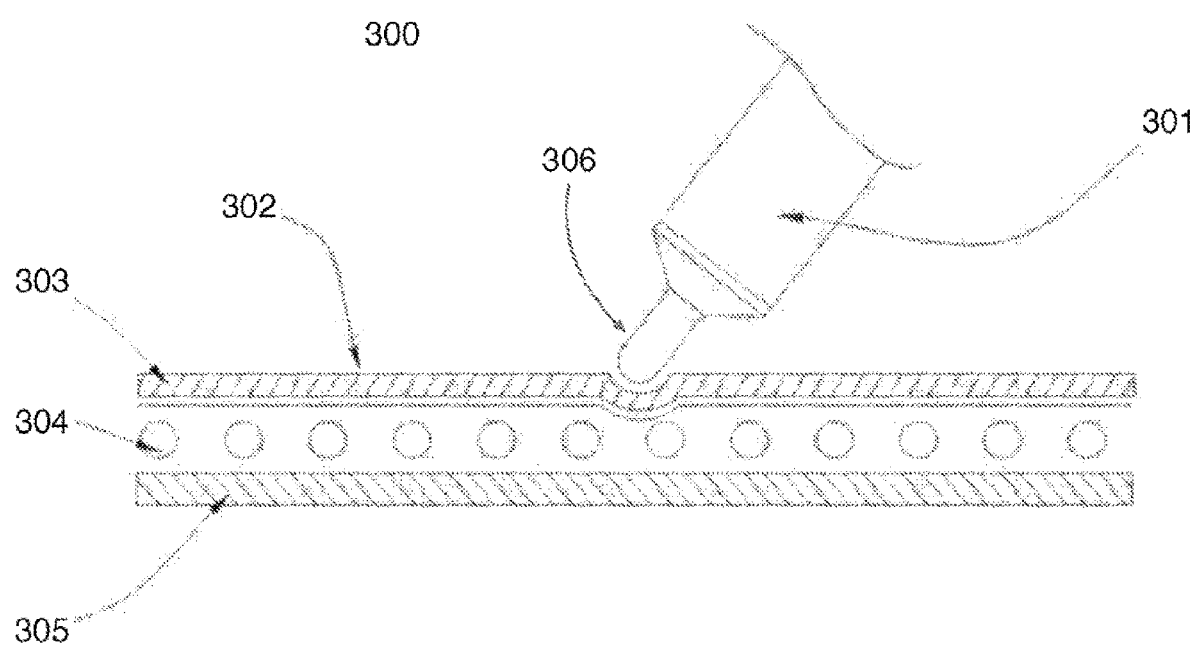
FIG. 3 is a side cross-sectional view of a writing instrument, touch sensor, and a writing surface, according to an exemplary embodiment of the present disclosure.

In another embodiment of the present disclosure and with reference to FIG. 3, the digital notepad 300 comprises a writing instrument 301. The writing instrument 301 comprises a tip 306 that is configured to interact with the writing surface 302. The writing surface 302 may comprise a plurality of sheets of paper 303. The plurality of sheets of paper 303 may be overlaid on top of a touch sensor 304. When writing, the tip 306 presses on the plurality of sheets of paper 303 and is registered by the touch sensor 304. The touch sensor 304 may be integrated into the digital notepad's base 305.

Figure 4:
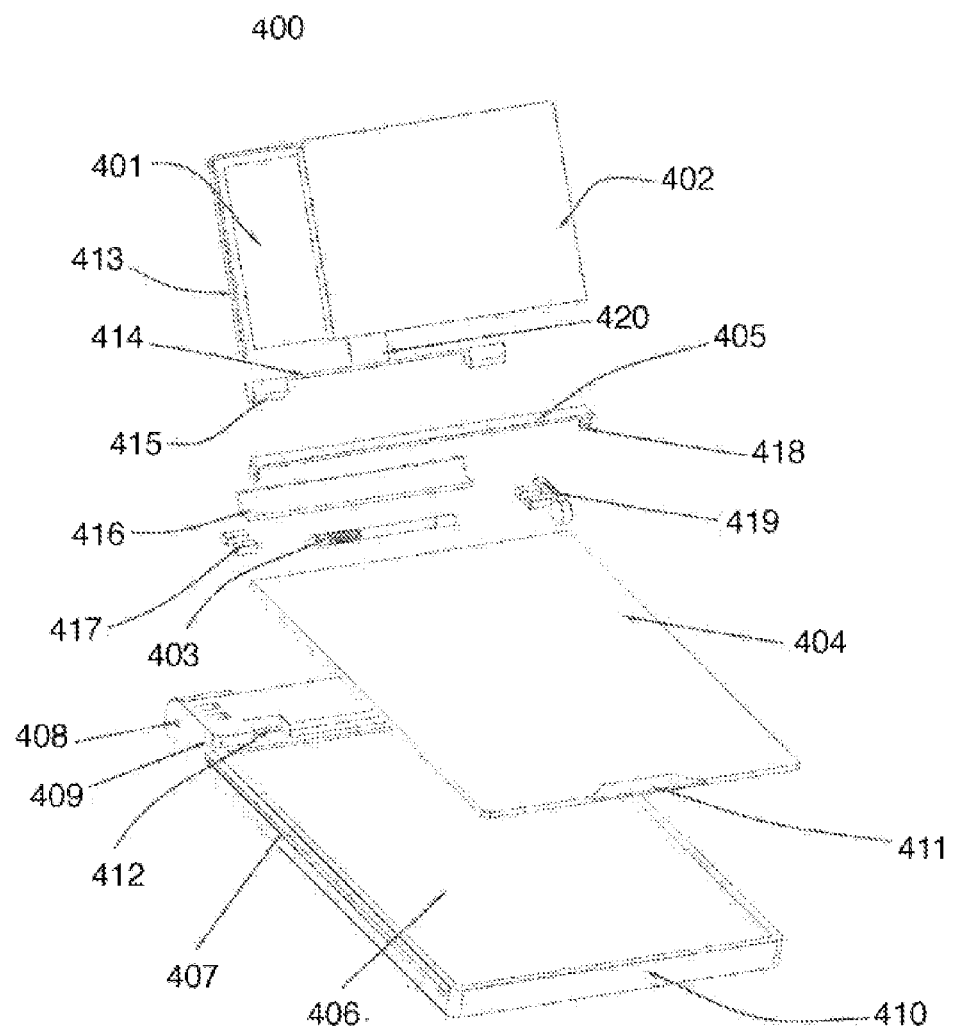
FIG. 4 is an isometric exploded view of a digital notepad, according to an exemplary embodiment of the present disclosure.

In another exemplary embodiment of the present disclosure and with reference to FIG. 4, the digital notepad 400 comprises a screen 401, a writing surface 404, a base 608. The screen 401 may comprise a screen cover 402. The screen cover 402 may be attached and removed from the screen 401 by a user. The screen 401 may be connected to the base 408 using a screen mount 414. The screen mount 414 may comprise screen extension 420 connecting the screen 401 to the screen mount 414. The screen extension 420 may be configured such that it extends and retracts, thereby allowing the user to adjust the screen's 401 location relative to the screen mount 414. The screen extension 420 may be configured such that a user may orientate the screen 401 in a desired orientation relative to the screen mount 414 or the digital notepad 400. The screen mount 414 may attach to the base 408 at mounting points 415. The mounting points 415 are configured such that the screen mount 414 is rotateably connected to the base 408 such that the user may rotate the screen 401 to a desired angle relative to the writing surface 404. The mounting points 415 are configured to hold the screen 401 in a desired orientation as determined and set by a user. The mounting points 415 may connect with the base 408 at points 412.

In another embodiment, the digital notepad 400 comprises a writing surface 404. The writing surface 404 may be a plurality of sheets of paper. A frame 410 traverses the perimeter of the writing surface 404 and is attached to the base 408. In one embodiment, the writing instrument 403 is a standard felt-tipped or ball-point pen. In another embodiment, the writing instrument 403 is communicatively connected to the digital notepad 400. The base 408 may comprise a dock (not shown) that may be used to store the writing instrument 403. The dock comprises a dock cover 416 that is rotateably attached to the base 408 such that a user may open and close the dock cover 416. The screen 401 may be configured to display the writing instrument's 403 traces made on the writing surface 404 in real-time or near real-time.

In another embodiment, the digital notepad 400 may comprise an eraser 405. In one embodiment, the eraser 405 traverses the writing surface 404. The eraser 405 may be slideably connected to the frame 410 at eraser points 418. In such an embodiment, the frame 410 comprises one or more eraser channels 407 that traverse one or more sides of the frame 410. The eraser 405 is slideably attached to the frame 410 by having eraser points 418 disposed within the eraser channels 407. In one embodiment, the eraser channels 407 may be configured such that the eraser's 405 position is recognized and captured by the digital notepad 400. In other embodiments, the eraser 405 is configured to resemble a traditional eraser. In another embodiment, the eraser 405 may comprise a heating element configured to induce a reaction from thermally-reactive ink used in writing instrument 403. In such an embodiment, the eraser points 418, the channels 407, the frame 410, and the base 408 may be configured to deliver power to the eraser's 405 heating element.

In another embodiment, a touch sensor 406 may be integrated in the base 408. The touch sensor 406 may comprise a resistive-, capacitive-, or projected capacitance-type touch sensor. The touch sensor 406 is communicatively connected to the digital notepad 400. The touch sensor 406 may be configured to interact with the writing instrument 403.

In another embodiment, a sheet of paper 404 may be used in conjunction with the digital notepad 400. In such an embodiment, the base 408 comprises a notch 409 into which the paper 404 may be placed. The base 408 may further comprise a notch retainer 419 that secures the paper 404 to the base 408 within the notch 409. The frame 410 may comprise a retainer 411 that holds the paper 404 in place while a user marks on the paper 404. In such an embodiment, the user may install the sheet of paper 404 by sliding one end into the notch 409 and securing the opposite end with the retainer 411. The user may use the writing instrument 403 to mark on the paper 404. The user's marks are also recognized and captured by the touch sensor 406. In another embodiment, the eraser 405 and the writing instrument's 403 ink are configured such that the eraser 405 is capable of erasing the writing instrument's 403 ink from the paper 404. In another embodiment, the writing instrument 403 is configured to use thermally-reactive ink. In such an embodiment, the eraser 403 comprises a thermal element (not shown) that is configured to induce a reaction from the writing instrument's 403 thermally-reactive ink.

Figure 5:
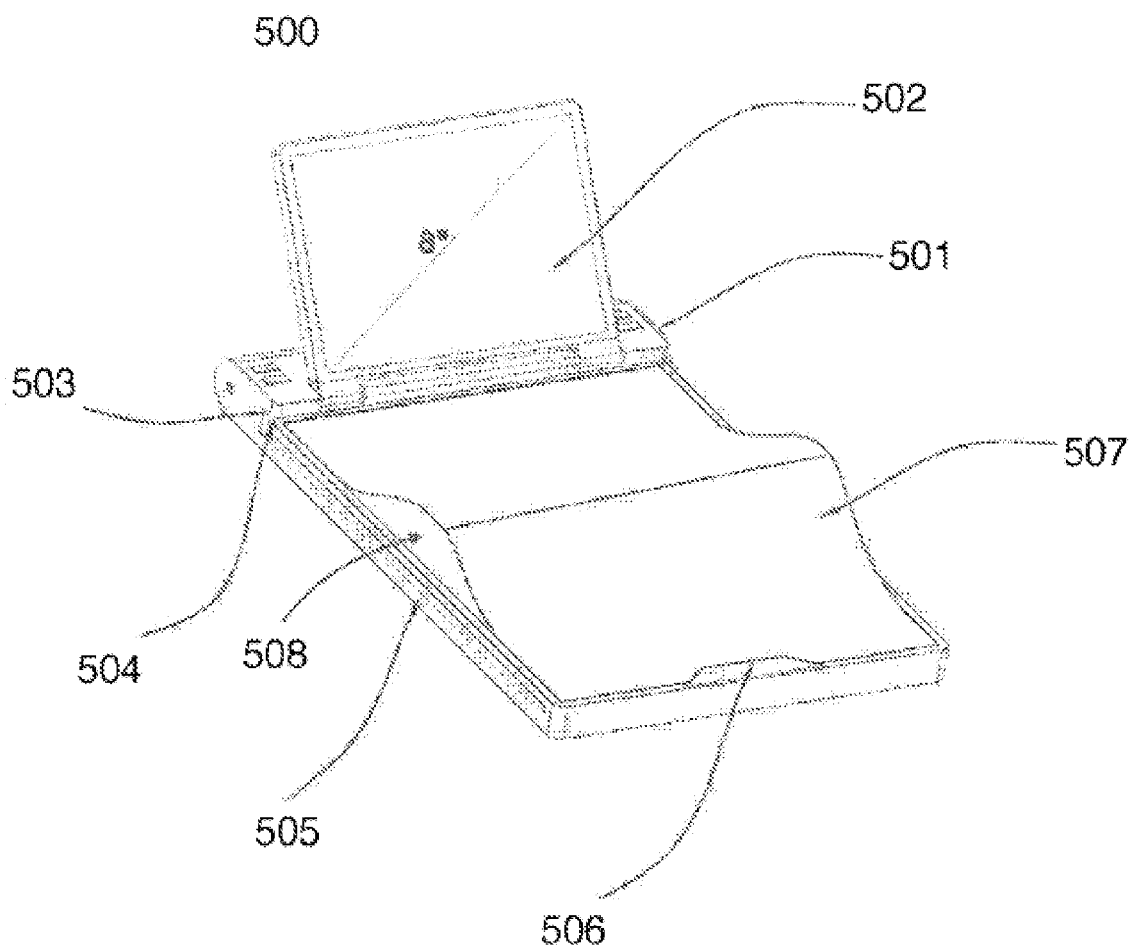
FIG. 5 is an isometric assembly view of a digital notepad incorporating a sheet of paper, according to an exemplary embodiment of the present disclosure.

In another exemplary embodiment of the present disclosure and with reference to FIG. 5, the digital notepad 500 comprises a touch sensor 508, a screen 502, an eraser 504, and a writing surface 507. The base 501 may be configured such that the eraser 504 is retractable into the base 501. The digital notepad 500 may be configured such that a user may attach a sheet of paper 507 to the digital notepad 500. In such an embodiment, the base 501 comprises a notch 503 into which a user can slide the sheet of paper 507. The notch 503 is configured to secure the sheet of paper 507. The paper 507 may also be secured to the digital notepad 500 at another location using a retainer 506. The retainer 506 may be made from a rigid or semi-rigid material such as metal, plastic, or silicon. In such an embodiment, the notch 503 and the retainer 506 secure the paper 507 to the digital notepad 500 such that a user can draw on the paper 507. In such an embodiment, the user's traces will be simultaneously imprinted onto the paper 507 and captured by the touch sensor 508. The user's traces on the paper 507 may be displayed on the screen 502 in real-time or near real-time. Although the screen 502 is shown as having a diagonal width of 8 inches, a screen 502 of any size, shape, or orientation may be used. The screen 502 may comprise a mobile device or a tablet that is communicatively connected to the digital notepad 500.

Figure 6:
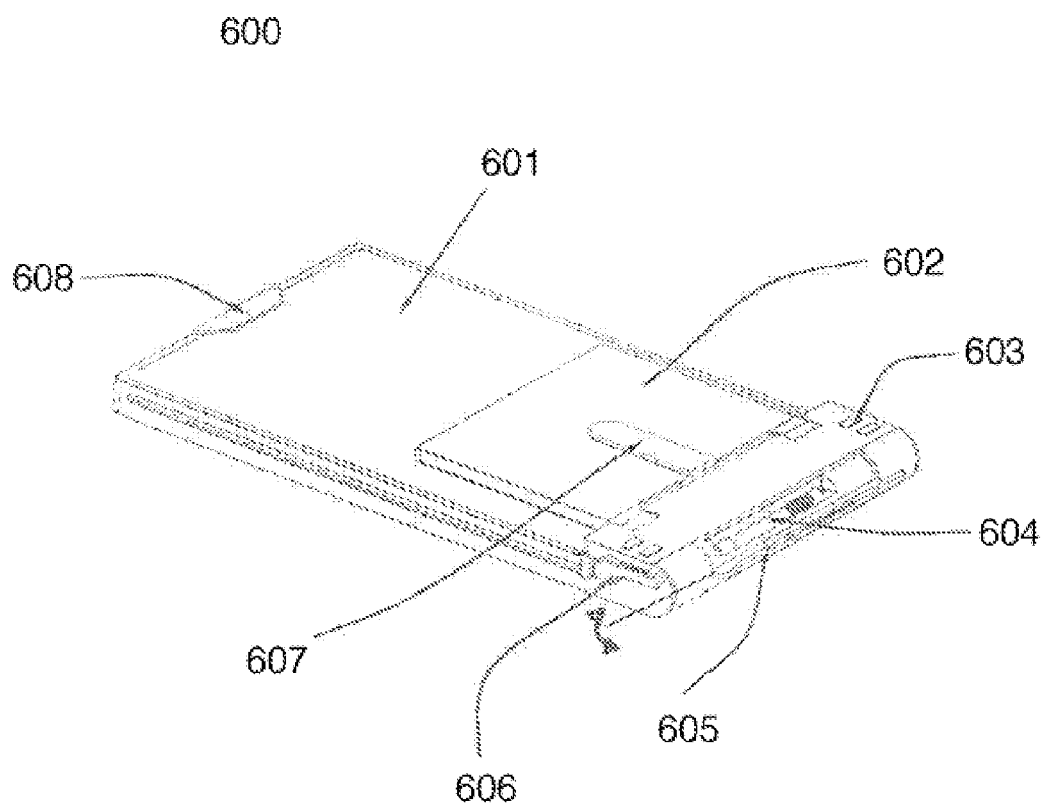
FIG. 6 is an isometric assembly view showing a digital notepad in a closed configuration, according to an exemplary embodiment of the present disclosure.

In another exemplary embodiment of the present disclosure and with reference to FIG. 6, the digital notepad 600 may be configured such that it is collapsible. In such an embodiment, the digital notepad 600 comprise a plurality of sheets of paper 601, a screen 602, a base 603, and a writing instrument 604. The base 603 may comprise a notch 606 configured to secure the paper 601. The base 603 may also comprise a retainer 608. The digital notepad 600 may also comprise a screen mount 607 moveably attached to the screen 602 and the base 603. The base 603 may comprise dock 605. The dock 605 may be configured to store the writing instrument 604 and have a cover that encapsulate the writing instrument 604 when it is stored in the dock 605. The screen mount 607 may configured such that it is rotateably attached to the base 603. In such an embodiment, a user may rotate the screen 602 to an open position (as shown in FIGS. 1, 2, 4, and 5) to a closed position. The screen mount 607 may also be configured such that the screen 602 may be reoriented by the user when in the open position. The screen mount 607 may also be configured such that a user can detach the screen 602 and/or the screen mount 607 from the base 603. The dock 605 may be configured to connect with writing instrument 604 such that the digital notepad 600 may recharge a power source within the writing instrument 604. Additionally, the dock 605 may be configured such that the digital notepad 600 may upload or download information to or from the writing instrument 604.

Figure 6A:
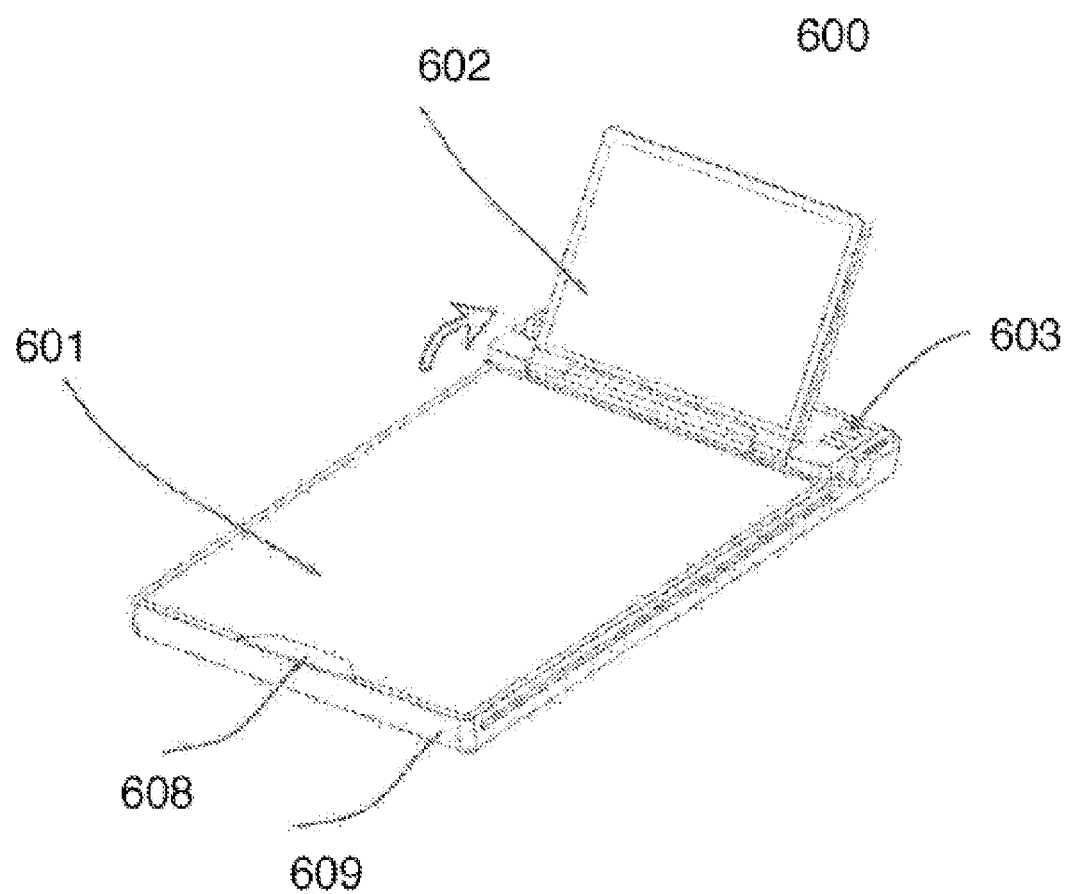
FIG. 6A is an isometric assembly view of a digital notepad showing how a user would configure it from a closed to an open configuration, according to an exemplary embodiment of the present disclosure.

In another exemplary embodiment of the present disclosure and with reference to FIG. 6A, the digital notepad 600 may be opened from its closed state (as shown in FIG. 6). In such an embodiment, a user may rotate the screen 602 about the base 603 using the hingeably-attached screen mount 607. In such an embodiment, the digital notepad 600 is configured such that it is turned on by the user rotating the screen 602.

Figure 7:
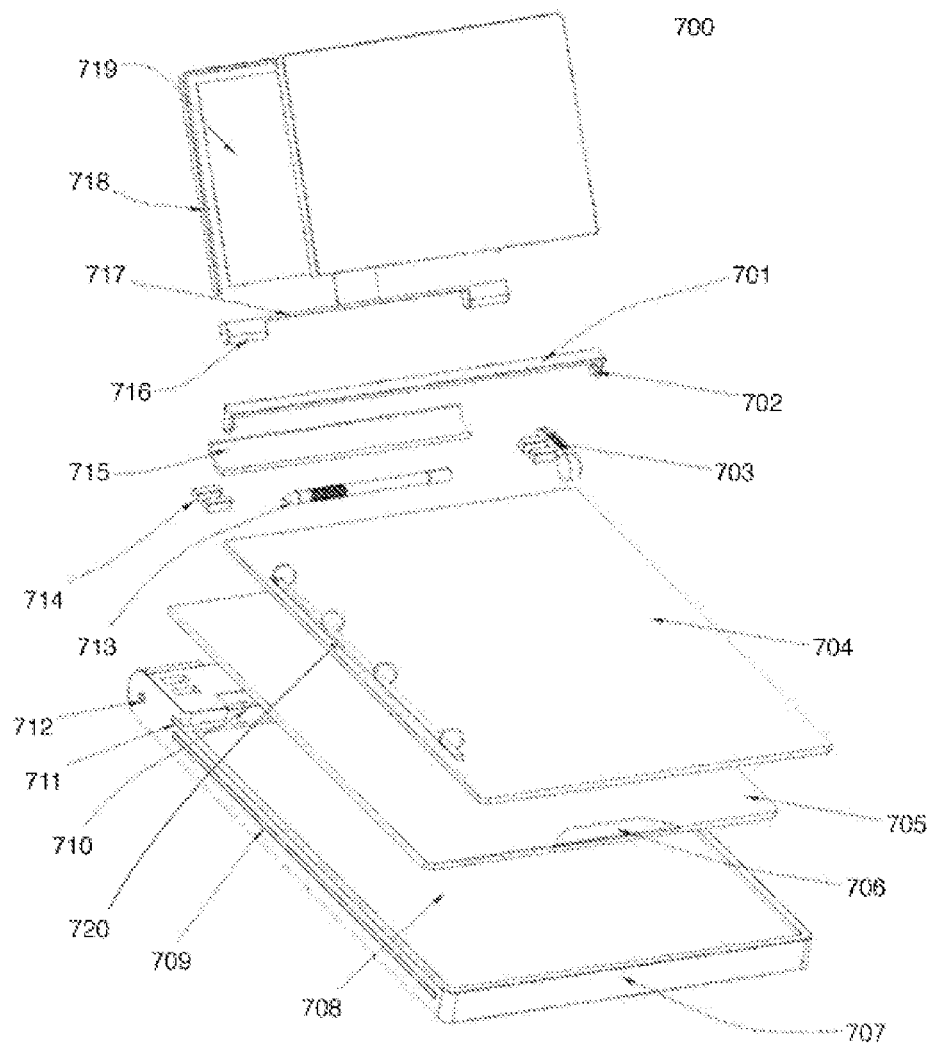
FIG. 7 is an isometric exploded view of a digital notepad, according to an exemplary embodiment of the present disclosure.

In another exemplary embodiment of the present disclosure and with reference to FIG. 7, the digital notepad 700 comprises a screen 719, a paper support 704, a base 712. The screen 719 may comprise a screen cover. The screen cover may be attached and removed from the screen 719 by a user. The screen 719 may be connected to the base 712 using a screen mount 717. The screen mount 717 may comprise screen extension connecting the screen 719 to the screen mount 717. The screen extension may be configured such that it extends and retracts, thereby allowing the user to adjust the screen's 719 location relative to the screen mount 717. The screen extension may be configured such that a user may orientate the screen 719 in a desired orientation relative to the screen mount 717 or the digital notepad 700. The screen mount 717 may attach to the base 712 at mounting points 716. The mounting points 716 are configured such that the screen mount 717 is rotateably connected to the base 712 such that the user may rotate the screen 719 to a desired angle relative to the paper support 704. The mounting points 716 are configured to hold the screen 719 in a desired orientation as determined and set by a user. The mounting points 716 may connect with the base 712 at points 710.

In another embodiment, the digital notepad 700 comprises a paper support 704. The paper support 704 may retain a plurality of sheets of paper bound together by binding 720. Although a four-ring biding is shown as the binder 720, any type of binding may be used, including sewing, spiral binding, a plurality of binding rings, or adhesives. In an embodiment where touch sensors are integrated into the paper, the binding 720 may also be configured to communicatively connect the touch sensors to the digital notepad 700. A frame 707 traverses the perimeter of the paper support 704 and is attached to the base 712. In one embodiment, the writing instrument 713 is a standard felt-tipped or ball-point pen. In another embodiment, the writing instrument 713 is communicatively connected to the digital notepad 700. The base 712 may comprise a dock (not shown) that may be used to store the writing instrument 713. The dock comprises a dock cover 715 that is rotateably attached to the base 712 such that a user may open and close the dock cover 715. The screen 719 may be configured to display the writing instrument's 713 traces made on the paper support 704 in real-time or near real-time.

In another embodiment, the digital notepad 700 may comprise an eraser 701. In one embodiment, the eraser 701 traverses the paper support 704. The eraser 701 may be slideably connected to the frame 707 at eraser points 702. In such an embodiment, the frame 707 comprises one or more eraser channels 709 that traverse one or more sides of the frame 707. The eraser 701 is slideably attached to the frame 707 by having eraser points 702 disposed within the eraser channels 709. In one embodiment, the eraser channels 709 may be configured such that the eraser's 701 position is recognized and captured by the digital notepad 700. In other embodiments, the eraser 701 is configured to resemble a traditional eraser. In another embodiment, the eraser 701 may comprise a heating element configured to induce a reaction from thermally-reactive ink used in writing instrument 713. In such an embodiment, the eraser points 702, the channels 709, the frame 707, and the base 712 may be configured to deliver power to the eraser's 701 heating element.

In another embodiment, a touch sensor 708 may be integrated in the base 712. The touch sensor 708 may comprise a resistive-, capacitive-, or projected capacitance-type touch sensor. The touch sensor 708 is communicatively connected to the digital notepad 700. The touch sensor 708 may be configured to interact with the writing instrument 713.

In another embodiment, a sheet of paper 705 may be used in conjunction with the digital notepad 700. In such an embodiment, the base 712 comprises a notch 711 into which the paper 705 may be placed. The base 712 may further comprise a notch retainer 703 that secures the paper 705 to the base 712 within the notch 711. The frame 707 may comprise a retainer 706 that holds the paper 705 in place while a user marks on the paper 705. In such an embodiment, the user may install the sheet of paper 705 by sliding one end into the notch 711 and securing the opposite end with the retainer 706. The user may use the writing instrument 713 to mark on the paper 705. The user's marks are also recognized and captured by the touch sensor 708. In another embodiment, the eraser 701 and the writing instrument's 713 ink are configured such that the eraser 701 is capable of erasing the writing instrument's 713 ink from the paper 705. In another embodiment, the writing instrument 713 is configured to use thermally-reactive ink. In such an embodiment, the eraser 713 comprises a thermal element (not shown) that is configured to induce a reaction from the writing instrument's 713 thermally-reactive ink.

Figure 8:
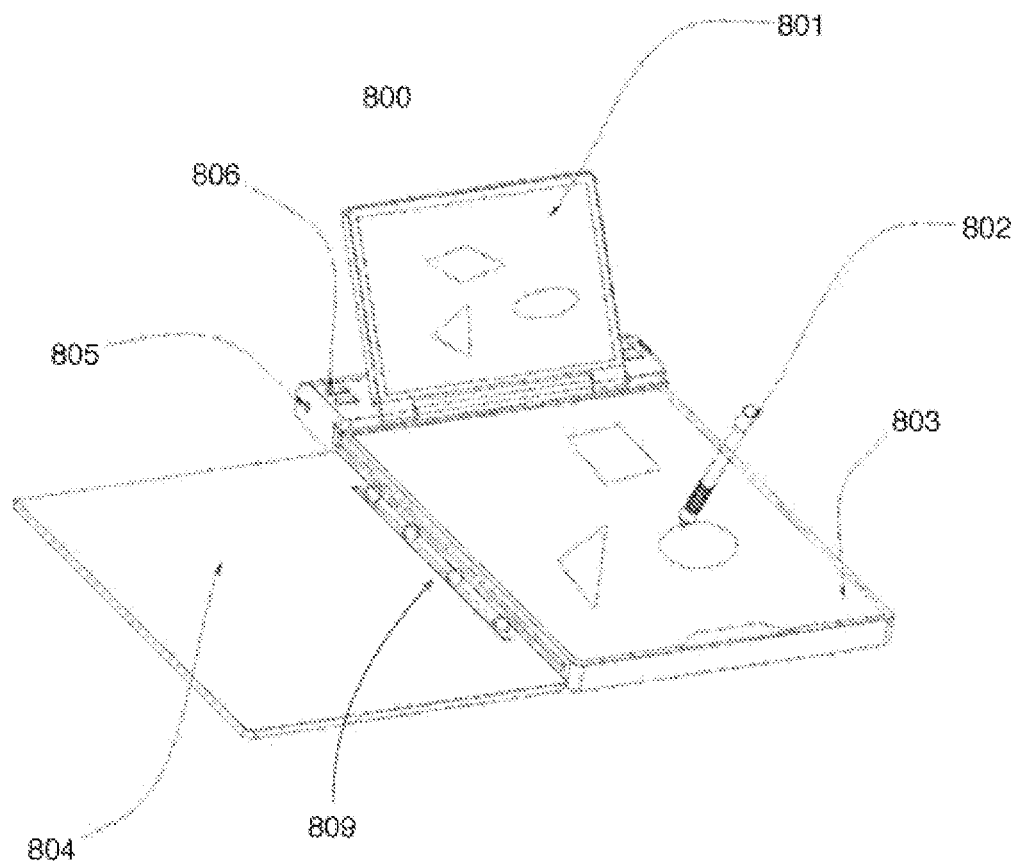
FIG. 8 is an isometric assembly view of a digital notepad incorporating a binder, according to an exemplary embodiment of the present disclosure.

In another exemplary embodiment of the present disclosure and with reference to FIG. 8, the digital notepad 800 comprises a base 805, an onboard computer 806, a screen 801, a writing surface 803, and a writing instrument 802. The writing surface 803 may comprise a plurality of sheets of paper. A touch sensor (not shown) that is communicatively connected to the digital notepad 800 may be disposed underneath the writing surface 803. Markings on the writing surface 803 may be displayed on the screen 801. The digital notepad 800 may also comprise a paper support 804. The support 804 may also comprise a touch sensor. The support 804 may be detachably connected to the digital notepad 800. The support 804 may be configured and orientated such that paper retained by the binder 809 is easily flipped or turned onto the writing surface 803.

Figure 8A:
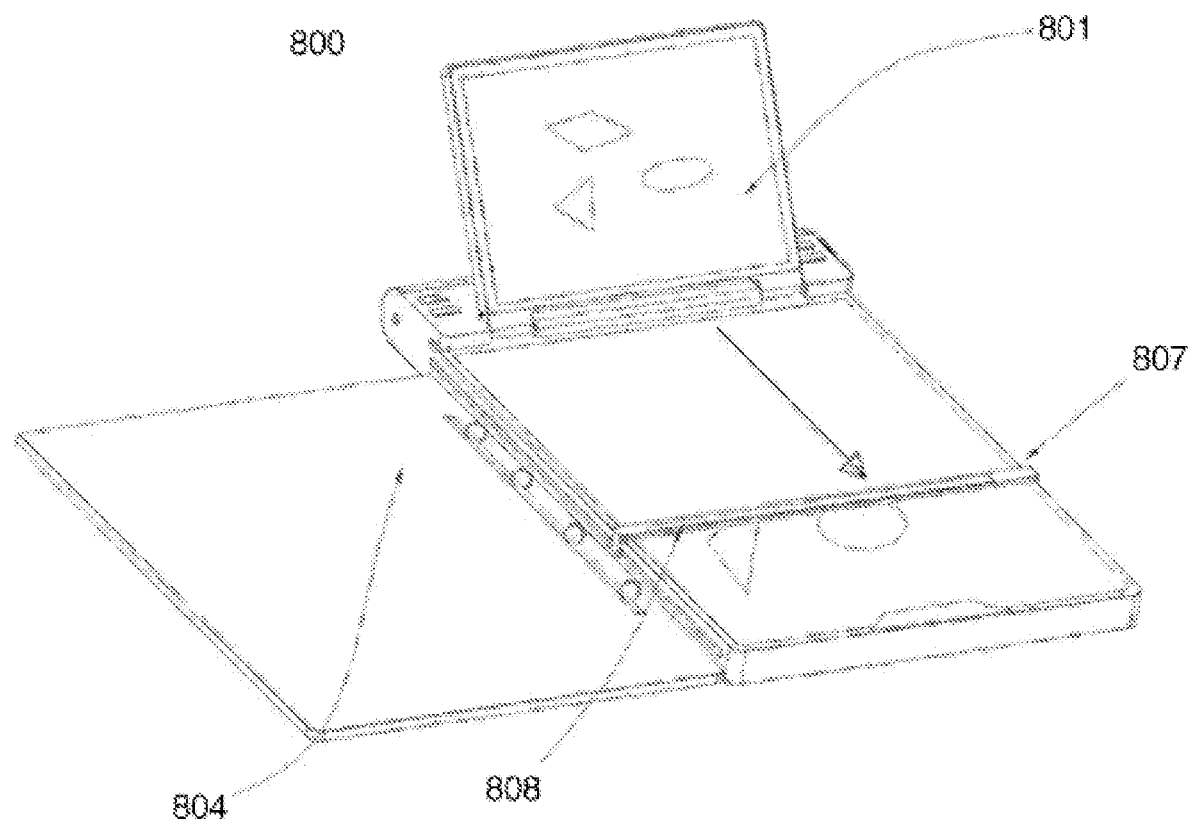
FIG. 8A is an isometric assembly view of a digital notepad incorporating a binder and showing how a user would erase markings, according to an exemplary embodiment of the present disclosure.

In another exemplary embodiment of the present disclosure and with reference to FIG. 8A, a user may erase markings made on the writing surface 803. In such an embodiment, an eraser 807 may be slideably connected to the digital notepad 800. In one embodiment, the writing instrument 802 may comprise thermally reactive ink. In such an embodiment, a thermal element may be integrated into the eraser 807 and configured to induce a reaction from the writing instrument's 802 ink. In one embodiment, erasing may be effectuated by the user by sliding the eraser 807 from one end of the writing surface 803 to another.

Figure 9:
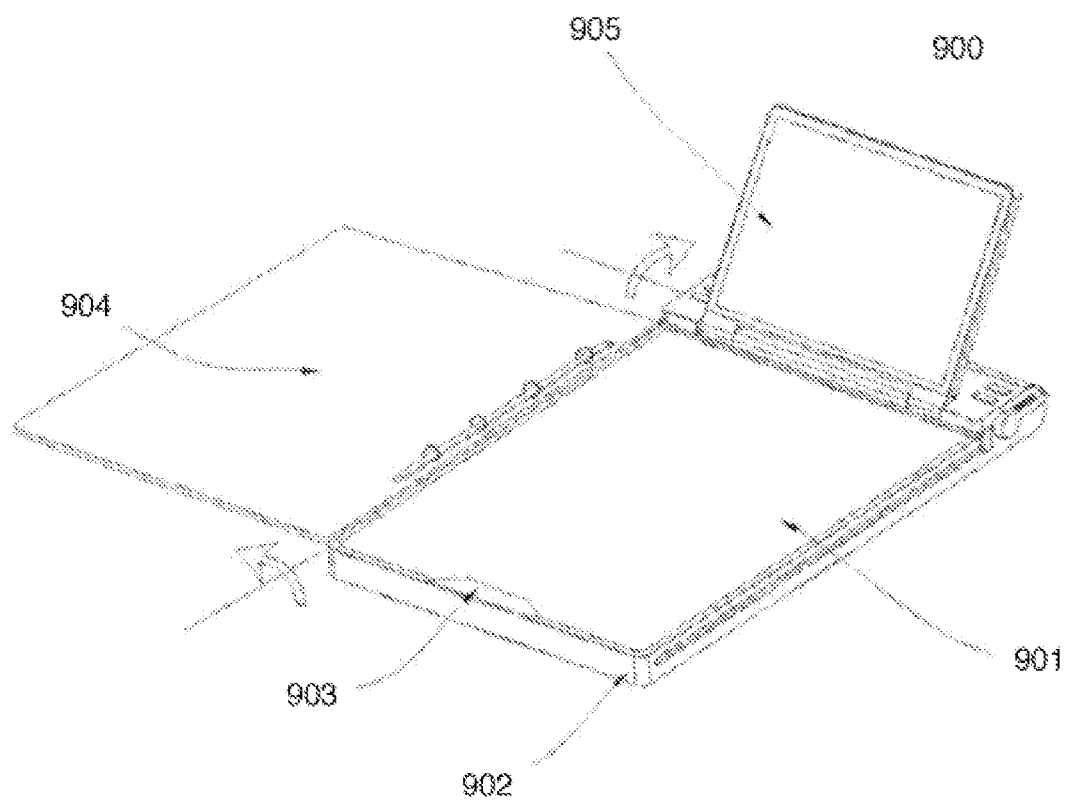
FIG. 9 is an isometric assembly view of a digital notepad showing a hingeably attached binder and screen, according to an exemplary embodiment of the present disclosure.

In another exemplary embodiment of the present disclosure and with reference to FIG. 9, the support 904 and the screen 905 may be configured such that they are rotateably connected to the digital notepad 900. In such an embodiment, a user can initiate the loading or starting sequence of the digital notepad's 900 onboard computer. The touch sensor 901 may comprise also comprise a screen.

Figure 10:
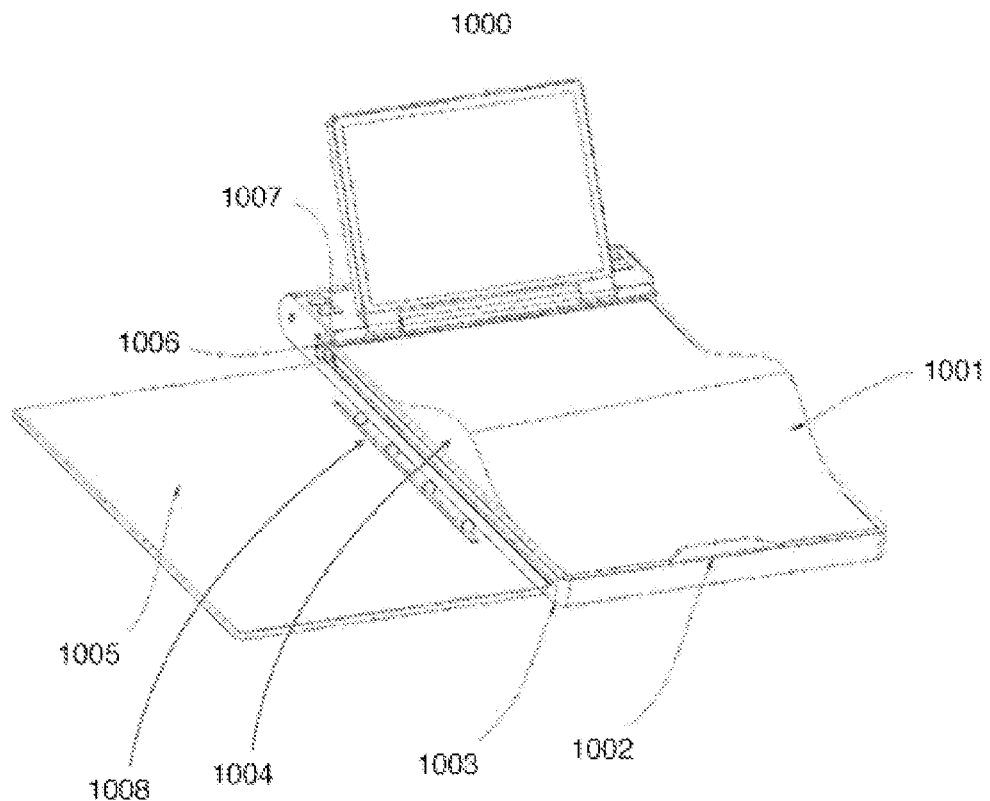
FIG. 10. is an isometric assembly view of a digital notepad incorporating a sheet of paper and a hingeably attached binder, according to an exemplary embodiment of the present disclosure.

In another exemplary embodiment of the present disclosure and with reference to FIG. 10, a sheet of paper 1001 may be placed over the touch sensor 1004. In such an embodiment, the paper 1001 may be a lose sheet of paper or one that is retained on the support 1005. The paper 1001 may be retained on the writing surface 1004 by a notch 1006 and a retainer 1002 integrated into the frame 1003. The support 1005 may be rotateably connected to the frame 1003.

Figure 10A:
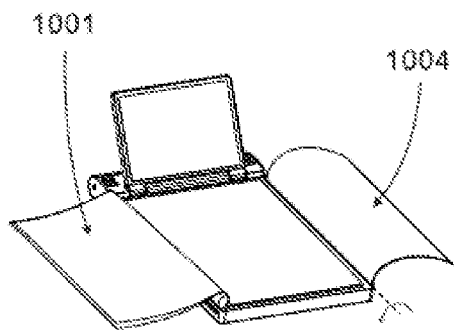
FIGS. 10A-10D are isometric assembly views of a digital notepad incorporating a plurality of flexible touch sensors, according to an exemplary embodiment of the present disclosure.
Figure 10B:
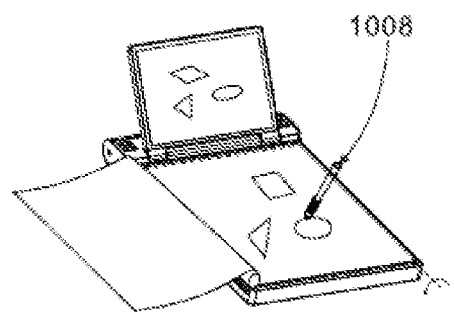

In another exemplary embodiment of the present disclosure and with reference to FIGS. 10A and 10B, the touch sensor 1004 may be configured as a flexible sheet. In such an embodiment, the touch sensor 1004 may be connected at one or more points to the digital notepad 1000. The touch sensor 1004 may be pulled, drawn away, or rotated away and place under one or more sheets of paper 1001. The paper 1001 may be secured to the body of the digital notepad 1000 using a binder 1008. In such an embodiment, the desired paper 1001 may be selected by the user and place over or under the touch sensor 1004. Once in place, the user may mark on the desired paper 1001 using the writing instrument 1008; the markings may be captured and displayed on the screen. In another embodiment, the touch sensor 1004 may comprise a plurality of layers, each layer having a touch sensor. In such an embodiment, each of the plurality of touch sensors 1004 may be disposed between layers of the paper 1001. Each of the plurality of the touch sensors 1004 are communicatively connected to the digital notepad 1000.

Figure 10C:
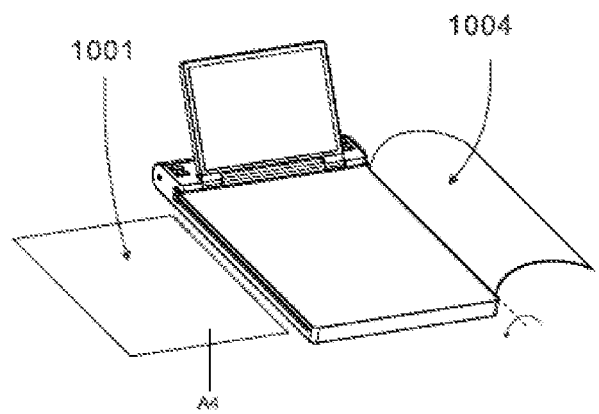
Figure 10D:
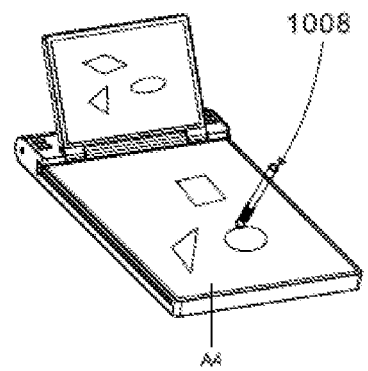

In another exemplary embodiment of the present disclosure and with reference to FIGS. 10C and 10D, the plurality of paper 1001 may comprise loose sheets of paper 1001. In such an embodiment, the each of the plurality of flexible touch sensors 1004 may be placed, by the user, between two or more sheets of paper 1001.

Figure 11:
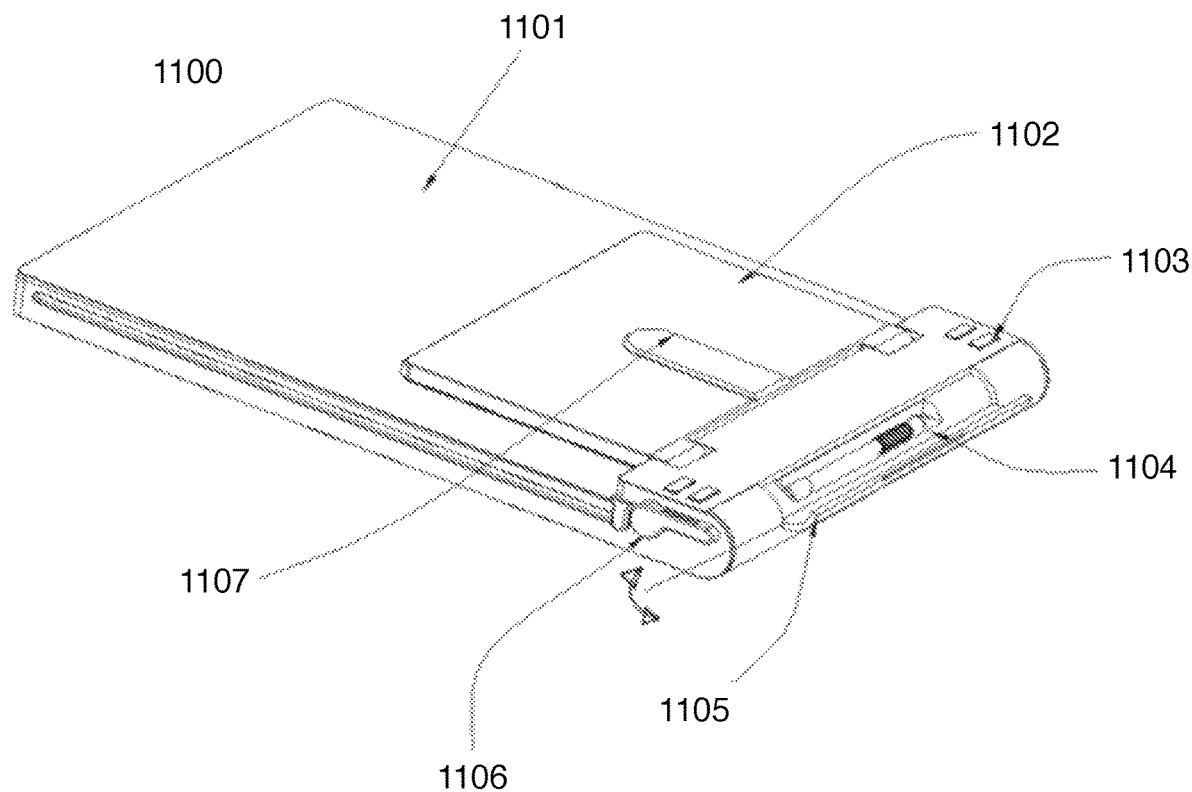
FIG. 11 is an isometric assembly view of a digital notepad incorporating a support in a closed configuration, according to an exemplary embodiment of the present disclosure.

In another exemplary embodiment of the present disclosure and with reference to FIG. 11, the digital notepad 1100 may be configured such that it is collapsible. In such an embodiment, the screen 1102 and the support 1101 may both be rotateably connected to the base 1103. The support 1101, the base 1103, and/or the screen 1102 may be configured such that when the digital notepad 1100 is collapsed, the onboard computer (not shown) initiates a shutdown or sleep process. The support 1101 may further serve to protect the touch sensors integrated into the digital notepad 1100.

Although a digital notepad has been shown and described, the invention disclosed herein may be implemented according to other embodiments of the disclosure. For example, the digital notepad may be implemented as a large, presentation board. In such an embodiment, the digital notepad's writing surface may be large enough to be viewed by a large audience such as a presentation hall or classroom. In another embodiment, the digital notepad's screen may be large enough to be viewed by a large audience by, for example, using a protector to display the information onto a screen. In such an embodiment, the writing surface may be small enough to be handheld by the presenter. In another embodiment, the writing surface itself may be large enough to be viewed by a large audience in addition to the screen utilizing a projector.

In an embodiment of the disclosure, the methodologies and techniques described herein are implemented on a special purpose digital notepad having a computer programmed to recognize, capture, record, and send the traces made by a user on the writing surface utilizing a writing instrument. In an embodiment of the disclosure, the special-purpose computer comprises an embedded system with a dedicated processor equipped as part of the digital notepad. The disclosure has been described herein using specific embodiments for the purposes of illustration only. It will be readily apparent to one of ordinary skill in the art, however, that the principles of the disclosure can be embodied in other ways. Therefore, the disclosure should not be regarded as being limited in scope to the specific embodiments disclosed herein, but instead as being fully commensurate in scope with the following claims.

I claim:

1. A digital notepad comprising:
   an onboard computer;
   a base comprising a plurality of retainers;
   a writing instrument comprising a tip and a body; wherein the tip is configured to write on a writing surface;
   wherein the tip traverses outward from the body to trigger a writing configuration comprising a communicative connection between the writing instrument and the digital notepad;
   wherein the tip retracts into the body to trigger a stowed configuration comprising a communicative disconnection between the writing instrument and the digital notepad;
   a plurality of sheets of paper; and
   a plurality of touch sensors communicatively connected to the onboard computer;
   wherein the onboard computer comprises one or more computer processors and a program loaded thereon configured to read information from at least one of the plurality of touch sensors;
   wherein at least one touch sensor of the plurality of touch sensors is integrated into the base;
   wherein at least one of the plurality of sheets of paper is retained on the base and in close proximity to the at least one touch sensor of the plurality of touch sensors by at least one of the plurality retainers;
   wherein at least one touch sensor of the plurality of touch sensors is configured to detect markings made on at least one of the plurality of sheets of paper; and
   an eraser slideably, movably, and detachably connected to the base, wherein the eraser further comprises an eraser tip, an eraser body, and a cap;
   wherein removal of the cap causes the eraser tip to traverse outward from the eraser body to trigger a communicative connection between the eraser and the digital notepad; and
   wherein placement of the cap causes the eraser tip to retract in to the eraser body to trigger a stowed configuration comprising a communicative disconnection with the digital notepad.

2. The digital notepad of claim 1, further comprising a display screen communicatively and structurally connected to the onboard computer and configured to display markings read by at least one of the plurality of touch sensors.

3. The digital notepad of claim 2, wherein the display screen further comprises a mobile device.

4. The digital notepad of claim 1, wherein the writing instrument comprises thermally reactive ink.

5. The digital notepad of claim 1, wherein the eraser comprises a thermal unit, and
   wherein the thermal unit is configured to change a temperature of the thermally reactive ink on at least one of the plurality of sheets of paper, such that a reaction is induced.

6. The digital notepad of claim 1, wherein at least one touch sensor of the plurality of touch sensors comprises a sensor selected from a group consisting of: a resistive touch sensor, a capacitive touch sensor, a projected capacitance touch sensor, and combinations thereof.

7. The digital notepad of claim 1, wherein at least one of the plurality of sheets of paper comprise:
   at least one of the plurality of touch sensors; and
   a flexible printed circuit;
   wherein the at least one of the plurality of touch sensors integrated into the at least one of the plurality of sheets of paper is communicatively connected to the onboard computer.

8. The digital notepad of claim 1 further comprising a support movably attached to the base, the support comprising a binder configured to retain one or more sheets of the plurality of sheets of paper.

9. The digital notepad of claim 8, wherein the support further comprises at least one touch sensor of the plurality of touch sensors.

10. The digital notepad of claim 1, wherein the onboard computer is communicatively connected to an external computer or an external database.

11. A method for capturing notes comprising steps of:
    reading, by at least one of a plurality of touch sensors of a digital notepad, attributes of marks made on at least one of a plurality of sheets of paper by a writing instrument, the attributes including positional information relating to the marks relative to the at least one of the plurality of touch sensors,
    wherein the plurality of sheets of paper are near to at least one of the plurality of touch sensors; and
    receiving, at an onboard computer disposed within a base, the attributes read by the at least one of the plurality of touch sensors;
    wherein the writing instrument comprises a tip and a body;
    wherein the tip traverses outward from the body to trigger a communicative connection between the writing instrument and the digital notepad;
    wherein the tip retracts into the body to trigger a communicative disconnection between the writing instrument and the digital notepad; and
    erasing, marks on at least one of the plurality of sheets of paper using an eraser;
    wherein the eraser is slideably, movably, and detachably connected to the base;
    wherein the eraser comprises an eraser tip, an eraser body, and a cap;

wherein removal of the cap causes the eraser tip to traverse outward from the eraser body to trigger a communicative connection between the eraser and the digital notepad; and wherein placement of the cap causes the eraser tip to retract in to the eraser body to trigger a stowed configuration comprising a communicative disconnection with the digital notepad.

12. The method for capturing notes of claim 11, further comprising:

sending, from the onboard computer to a display screen movable and detachably connected to the base, the positional information read from the at least one of the plurality of touch sensors; and displaying, on the display screen, a graphical representation of the positional information read from the at least one of the plurality of touch sensors.

13. The method for capturing notes of claim 11, further comprising a step of erasing, the step of erasing comprising steps of:

heating, by the eraser, one of the plurality of sheets of paper having a thermally reactive ink thereon, the eraser, comprising a thermal unit; and inducing a reaction of the thermally reactive ink.

14. The method for capturing notes of claim 11, wherein at least one of the plurality of sheets of paper comprise at least one of the plurality of touch sensors.

15. The method for capturing notes of claim 11, wherein the method further comprises a step of sending information to an external computer or an external database.

16. The method for capturing notes of claim 11, wherein at least one of the touch sensors comprises a sensor selected from a group consisting of: a resistive touch sensor, a capacitive touch sensor, a projected capacitance touch sensor, and combinations thereof.

* * * * *